United States Patent Office 3,543,070
Patented Nov. 24, 1970

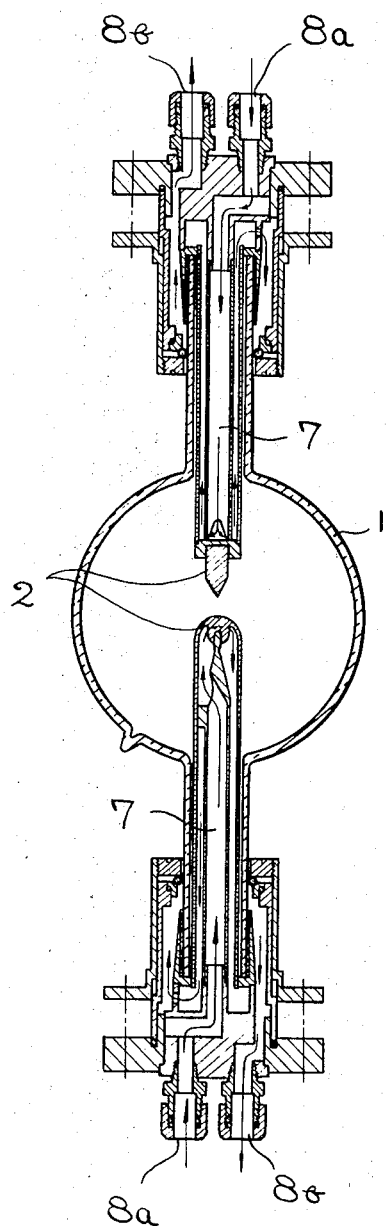
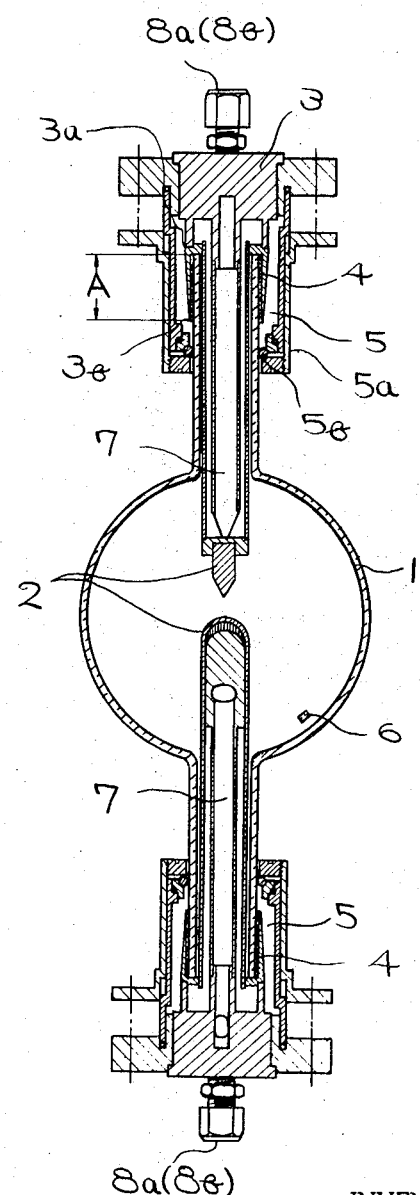

3,543,070
LIQUID COOLED HIGH-PRESSURE
DISCHARGE LAMP
Yoshihiko Nakamura, Himeji, Yasuo Ohnishi, Kobe, and Yasuhiro Shimizu, Himeji, Japan, assignors to Ushio Electric Inc., Tokyo, Japan
Filed Apr. 8, 1968, Ser. No. 719,647
Claims priority, application Japan, Oct. 20, 1967, 42/88,627; Jan. 18, 1968, 43/2,612, 43/2,613
Int. Cl. H01j 5/56, 7/26
U.S. Cl. 313—42      3 Claims

ABSTRACT OF THE DISCLOSURE

A liquid cooled high-pressure discharge lamp comprising electrodes, an envelope for the lamp, sealing portions for said envelope, and a cooling mechanism for said sealing portions.

---

The present invention relates to high-pressure discharge lamps, and in particular to a liquid cooled high-pressure discharge lamp.

High melting point alloys including an active metal, such as titanium, zirconium or the like, have hitherto been employed for providing a seal between a material, such as quartz, ceramics, sapphire or the like, and a metal.

However, this prior art method for providing a seal between a material and a metal has a disadvantage in that the alloys including an active metal, such as titanium, zirconium or the like, tend to contract when they are cooled from elevated temperatures at which they are melted to provide a bond at the operating temperatures at which they solidify, but that quartz, ceramics, sapphire or the like produce high internal stresses in the sealing portions because of its very low coefficient of expansion, making it impossible to provide a mechanically safe seal between the material and the metal.

When this sealing process is employed in high-pressure discharge lamps in which a high-pressure gas or mercury is enclosed, there has been the danger of explosion of lamps due to the strain of the sealing portions.

Accordingly, one object of this invention is to provide a liquid cooled high-pressure discharge lamp which can obviate the aforementioned disadvantages of prior art discharge lamps.

Another object of the invention is to provide a liquid cooled high-pressure discharge lamp in which sealing portions of the discharge lamp are cooled by means of a liquid cooling mechanism.

Another object of the invention is to provide a liquid cooled high-pressure discharge lamp which comprises cylindrical closed end bases each having a wall thickness increasingly reduced in going from the bottom toward the forward end so as to impart flexibility to the forward end portion.

A further object of the invention is to provide a liquid cooled high-pressure discharge lamp in which a seal is provided between an envelope formed of quartz and metal members serving as conductors for electrodes or bases by means of a low melting point alloy which melts at temperatures below 200° C., and a cooling medium circulating passage is formed around the sealing portion.

A still another object of the invention is to provide a liquid cooled high-pressure discharge lamp in which a getter, which is an alkaline earth metal vaporized at temperatures ranging from normal temperatures to about 500° C., is provided inside the envelope so as to remove impure gases and water from inside the envelope.

Other objects and advantages of the invention will become apparent from consideration of the following description when taken in conjunction with the accompanying drawings, in which:

FIG. 1 is a longitudinal sectional plan view of a liquid cooled high-pressure discharge lamp according to this invention; and FIG. 2 is a longitudinal sectional side view of the discharge lamp of FIG. 1.

In the drawings, 1 is an envelope formed of quartz for the lamp; 2 designates electrodes; 3 designates bases or metal members serving as conductors for electrodes; and 4 designates sealing portions for providing a seal between said envelope 1 and said bases 3. It has hitherto been customary to provide a seal between the envelope 1 formed of quartz and the bases 3 by means of metallization. However, prior art discharge lamps of this type have had the disadvantage of being unable to provide a mechanically safe seal because of the fact that since quartz has a very low coefficient of expansion, the use of metal solders, which melt at elevated temperatures above 250° C., for providing a seal between the envelope and the metal members results in markedly high internal stresses being caused to occur in the sealing portions 4 by the envelope 1 formed of quartz when the sealing portions 4 are cooled from melting point temperatures to operating temperatures.

According to the present invention, the aforementioned disadvantage of prior art discharge lamps is obviated by using a low melting point temperature solder which melts at temperatures below about 200° C. for providing a seal at 4 between the envelope 1 formed of quartz and the bases 3. An annular space 5 is formed in each of the bases 3 enclosing the sealing portions 4 for passing a cooling liquid therethrough, and a getter 6 formed of barium or other alkaline earth metals vaporized at temperatures ranging from operating temperatures to about 500° C. is provided inside the envelope 1 in, for example, a space between the envelope 1 and the electrodes 2.

Cooling liquid inlet tubes 7 are inserted in the electrodes 2 for cooling the forward ends of the electrodes 2; and 8a and 8b are a cooling liquid inlet port and an outlet port respectively.

The discharge lamp according to this invention offers the advantage of minimizing residual strain at operating temperatures after the seal is provided by using an alloy having a melting point temperature below 200° C. as a sealing material as aforementioned. Another advantage of the discharge lamp according to this invention lies in the fact that melting of the sealing portions 3 due to high temperatures while in service is prevented because of a cooling liquid circulating through the space 5.

In practical applications, the present invention has been used with discharge lamps which a high-pressure xenon gas of about 20 to 40 atmospheric pressures is applied in operation.

When a low melting point solder melting at temperatures below about 200° C. is used as a sealing material for providing a seal at 4 as aforementioned, the temperatures at which evacuation of the envelope 1 is carried out must be limited to temperatures below the melting point temperature of the solder used. This may result in the envelope 1 or the electrodes 2 not being heated to desired temperatures, thereby preventing the thorough removal of impure gases and water from inside the envelope.

According to the present invention, the aforementioned disadvantage is obviated by the provision of the getter 6 formed of an alkaline earth metal in the envelope 1. The getter 6 is vaporized while the discharge lamp is actuated after the envelope is evacuated and sealed so as to remove impure gases and water that have not been removed inside the envelope in the evacuation operation.

From the foregoing description, it will be appreciated that the present invention permits minimizing residual strain in the sealing portions 4 of the discharge lamp, thereby enabling provision of a mechanically safe seal between the envelope and the metal members serving as conductors for the electrodes. The invention also permits maintaining the purity of gas in the envelope 1 at a predetermined level and preventing oxidation and degradation of emission characteristics of the electrodes because means is provided to remove impure gases and water from inside the envelope when the lamp is actuated. These advantages are combined to provide a discharge lamp of high output which has a high industrial value.

According to the present invention, each of the bases 3 is preferably formed such that the outer surface of the wall of the base 3 is tapered inwardly in going from the bottom $3a$ of the base 3 toward its forward end $3b$ in an angle in the range of 3 to 20 degrees, and that the ratio of the depth A of the base 3 inside its wall to the inner diameter of the base 3 is about 1:1.

With each of the bases 3 formed in the manner described above, the forward end portion $3b$ is very thin and flexible, so that when the bases 3 are sealed inside the envelope 1 residual strain caused to occur in the forward end portions of the bases by the sealing alloy is minimized. The larger thickness of the bottom $3a$ of each base 3 permits the base to have sufficiently high mechanical strength to withstand the strain caused by the sealing alloy which occur in the inner surfaces of the bottom of the base 3.

Since each of the bases 3 according to this invention is formed such that the ratio of its depth inside its wall to its inner diameter is about 1:1, the bases are prevented from being unloaded when pressure is applied thereto in the axial direction.

In the present invention, the annular space 5 for the cooling water to pass in circulation therethrough can be formed by an outer casing $5a$ separated from the base 3 and a packing $5b$ mounted between the forward end of said outer casing $5a$ and the outer circumferential surface of the envelope 1 formed of quartz to provide a liquid-tight seal.

The arrow indicates the direction of flow of the cooling water.

It should be understood that the specific preferred embodiment and practices which have been depicted and described herein have been presented by way of disclosure rather than limitation, and that those skilled in the art will appreciate that various modifications, combinations and substitutions may be effected without departure from the spirit and scope of this invention in its broader aspects and as set forth in the accompanying claims.

What is claimed is:

1. A liquid cooled high-pressure discharge lamp comprising an elongated envelope having oppositely extending hollow portions, an electrode mounted in each of said hollow portions and opposing each other, sealing portions for each end of said envelope, cooling means for each said sealing portions, and cylindrical bases one end of which is closed, each said base having a wall thickness which is increasingly reduced in going from the closed end to the open end in an angle in the range of 3 to 20 degrees, the ratio of the length of said base to the inner diameter of the base being about 1:1 whereby flexibility is imparted to the open end of the base.

2. A liquid cooled high-pressure discharge lamp according to claim 1 further comprising a low melting point alloy having a melting temperature below 200° C. and serving as a seal between said envelope and each said base.

3. A liquid cooled high-pressure discharge lamp according to claim 1 further comprising a getter formed of an alkaline earth metal and vaporized at temperatures below 500° C. which is provided inside the envelope to remove impure gases and water from inside the envelope.

References Cited
UNITED STATES PATENTS

| | | | |
|---|---|---|---|
| 1,529,626 | 3/1925 | Robinson | 313—43 X |
| 2,310,936 | 2/1943 | Chevigny | 313—32 X |
| 3,256,383 | 6/1966 | Sasorov | 174—17.07 |

JAMES W. LAWRENCE, Primary Examiner

E. R. LA ROCHE, Assistant Examiner

U.S. Cl. X.R.

313—43, 174